Sept. 29, 1970

C. M. SELWITZ 3,531,329

FUEL CELL ANODE COMPOSITION AND METHOD OF PREPARATION

Filed Nov. 7, 1966

INVENTOR.
CHARLES M. SELWITZ
BY
ATTORNEY

United States Patent Office 3,531,329
Patented Sept. 29, 1970

3,531,329
FUEL CELL ANODE COMPOSITION AND METHOD OF PREPARATION
Charles M. Selwitz, Pitcairn, Pa., assignor to Gulf Research & Development Company, Pittsburgh, Pa., a corporation of Delaware
Continuation-in-part of application Ser. No. 129,084, Aug. 3, 1961. This application Nov. 7, 1966, Ser. No. 600,328
Int. Cl. H01m *13/00, 27/00*
U.S. Cl. 136—120                                18 Claims

ABSTRACT OF THE DISCLOSURE

A fuel cell anode composition and method of preparation are proposed. The anode is prepared by depositing a Group VIII metal on the surfaces of a finely divided electrically conductive material, such as carbon, admixing the catalyzed carbon with a lyophobic plastic binder material such as polyethylene and pressure-forming the desired anode electrode to provide electrically conductive contact between the carbon particles.

---

Figure 1:
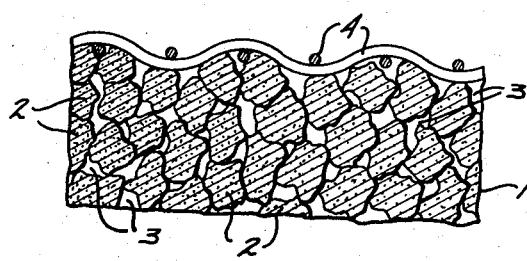

This application is a continuation-in-part of my copending application Ser. No. 129,084, filed on Aug. 3, 1961 and now abandoned.

This invention relates to an improved semilyophobic, gas permeable electrode adapted for use as an anode electrode in a fuel cell and to a method for preparing the same.

Fuel cells have been defined as galvanic cells whose output derives directly or indirectly from the free energy of oxidation of a fuel, usually a conventional fuel. The usual operation of such cells involves continuously feeding a gaseous oxidant and a gaseous fuel respectively to a porous cathode and a porous anode. The cathode and anode are spaced apart from one another and conductively connected by a body of electrolyte in contact therewith.

The use in fuel cells of gaseous oxidants such as air or oxygen and the use of gaseous fuels such as hydrocarbon, alcohols, hydrogen or carbon monoxide, impose special requirements on the structure of the electrodes. This is especially true of the anode where the reactions occurring are quite complex and require the use of a catalytic agent, usually a metal from Group VIII of the Periodic Table. The reactions occurring at the cathode are less complicated to the extent that the cathode can function without a catalytic agent, if desired. For example, in the air depolarized cathode-zinc batteries, the cathode is a pressed finely divided carbon as described on pages 125–127 of the Kirk-Othmer Encyclopedia of Chemical Technology, 2nd edition, vol. 3. If cathodic catalysts are employed, they function primarily to prevent polarization of the cathode electrodes by, for example, decomposition of peroxides formed.

The anode electrode of a fuel cell differs in that the reactions occurring at the anode are much more complex, especially when hydrocarbon fuels are used, and a catalyst is required on the anode to promote the desired reactions. It is necessary that an intimate contacting of catalyst, electrolyte and fuel gas be achieved at the anode in order to have a workable fuel cell. It is not sufficient with the anode of a fuel cell, however, to merely have a catalytic agent present, such as by physically admixing the catalytic agent with a powdered carbon. A much more intimate contacting is required. This more intimate contacting has been achieved in some instances by preparing the fuel cell from a pure metal which has achieved a porous structure through expensive preparation procedures, which involves varying the pore size structure throughout the electrode. The use of porous metals is undesirable not only from the standpoint of expense, but the porous metals are heavy and tend to flood more easily and thus render the cell inactive. In order to avoid the expense of porous metals and yet have an even larger surface area of metal available for the intimate contact required of anode fuel cell electrodes, it has been found desirable to deposit the anode catalytic agent on the surface of an inert, electrically conductive material, such as carbon, which preferably has as high a surface area as possible. In addition to being necessary to effect the required complicated anode reactions, the deposition of the catalytic agent on an inert electrically conductive material, such as carbon, allows fortuitously for the use of lesser amounts of the catalytic agent which further results, not only in a savings of money, but a savings in the weight of the anode which is an important consideration in the production of commercially acceptable fuel cell anodes. Furthermore, the deposition of the catalytic agent on the surfaces of the carbon tends to result in a more homogeneous or uniform structure. This attribute has important consequences with respects to the life and activity of the catalyst on spalling, as will be noted below.

Thus, the anode of a fuel cell must have a porous structure to permit diffusion of the gaseous fuel reactant therein, whereby intercontact of catalyst, reactant gas and electrolyte can be obtained. At the same time, the fuel cell anode must remain substantially unwetted by the electrolyte even though a substantial area of the electrode must be maintained in contact with the electrolyte. Thus, if too much of the anode surface area is covered by reactant gas and too little anode area is contacted by electrolyte, the internal resistance of the fuel cell will become quite large and polarization may occur with a consequent loss in the capacity of the cell to produce an electric current. On the other hand, if too much of the surface of the anode is covered by the electrolyte and too little of the surface is contacted by reactant gas, the output of the fuel cell will be limited because of the reduced contact between reactant gas and anode catalyst.

It has been previously proposed to prepare gas permeable fuel cell anodes by catalytic activation of gas permeable carbon electrodes in various ways. It has also been proposed to provide resistance to wetting of the anodes by the electrolyte by coating the preformed, activated anodes with waxes, oils, or other similar materials, or by the use of thin, preformed diaphragms of polyethylene or papers or cloths impregnated with waxes, oils, or silicones. However, in most such instances intricate electrode activation procedures have been required to produce reasonable open circuit voltages, and/or electrical current outputs have been relatively low because of high internal cell resistances arising out of the use of lyophobic coatings and impregnants. Also, the life of such previously proposed cells has been objectionably short as a result of the impermanence of the protection resulting from the superficial nature of the lyophobic coatings and impregnants.

In addition, one of the main problems in the fuel cell industry today involves spalling of the carbon particle electrodes with the consequent undesirable wetting of the interior sections of the anodes which render the fuel cell inoperative. The use of superficial coatings of lyophobic materials do not solve this problem since the spalled off sections take their protective coatings with them. The anodes rendered ineffective due to spalling must be removed and replaced or removed, recoated with a lyophobic material, and replaced. This procedure is expensive and time consuming. What is desired is an anode for use in a fuel cell which achieves the requisite intimate catalyst, reactant gas and electrolyte contact but which is as light in weight as possible while having the desired semi-lyophobic properties throughout the entire anode structure rather than just as a superficial coating.

All of the above desirable results have been achieved by the present invention which relates to a gas permeable, semi-lyophobic fuel cell anode member and to a method for manufacturing the same, said anode member being characterized by excellent permeability to fuel gas, and by outstanding semi-lyophobic properties throughout its structure with respect to the electrolytes, without a correspondingly large internal cell resistance.

The method of this invention is characterized by its simplicity, by its ability to produce good quality gas permeable fuel cell anodes at relatively low cost, and by its relative flexibility in preparing fuel cell anodes of uniform structure throughout. In accordance with the invention, fuel cell anode members of the above-indicated characteristics can be obtained by forming an electrically conductive, coherent anode structure from a moldable, lyophobic organic plastic binder that is inert with respect to the fuel cell reactants and electrolyte with which it is to be contacted in a fuel cell, said organic plastic binder having distributed therein discrete, finely divided porous particles of an electrically conductive material that is inert with respect to the fuel cell reactants and electrolyte with which it is to be contacted in a fuel cell, said electrically conductive material having distributed on its surfaces an activating agent, ordinarily in an amount of 0.02 to 20 percent by weight of the carrier, that will catalytically promote the desired anode reaction. The anode member is suitably formed under a molding pressure sufficient to provide electrically conductive contact between adjacent particles of the conductive material substantially throughout the anode mass. Good results are obtainable at temperatures at which the binder plastic is flowable by the use of molding pressures of 50 to 50,000 p.s.i., preferably 2,000 to 4,000 p.s.i., but other pressures can be used. The moldable organic plastic is present in the anode member in a proportion sufficient to bind the electrically conductive particles together in a coherent structure, but not so great as to electrically insulate a substantial proportion of such particles from adjacent, like particles. Depending upon the nature of the binder plastic, good results are obtainable with about 2 to 80 percent, preferably 10 to 50 percent of the binder, but other proportions can be used.

It was quite surprising that anode structures defined above and prepared by the sequential steps of catalytic deposition and then compression in the presence of a lyophobic binder should be active. Previous workers had stressed that the lyophobic coating should be only on the external surface of fuel cell anode structures and even then should be deposited only in the larger pores. In the anode of the present invention, the lyophobic binder is intimately admixed with the electrically conductive material having a catalytic agent deposited on its surfaces. Since the primary property of the lyophobic binder is to repel the electrolyte, it was not known whether the binder would repel the electrolyte and/or mask the effectiveness of the catalytic agent to the extent where the anode would be rendered inoperative. For reasons which are not understood, admixing the lyophobic binder with the electrically conductive material containing a catalytic agent deposited thereon resulted in an active anode for a fuel cell while having, in addition, all of the advantaegs noted above with respects to low weight, long life despite spalling, and ease of preparation. Indeed, the anode electrodes of this invention retain all of the advantages of anode electrodes in the art while, unexpectedly, possessing, in addition, the advantages of long life, and ease of cleaning. The anode structures of this invention can be cleaned by chemical or physical means and have the ability to present a fresh active surface for further reaction. This ability is due to the fact that the anode structure has substantial uniformity of composition throughout. Further, the addition of the binding agents of the present invention adds a new plasticity to the finely divided carbon which allows for ease in the formation of anodes of varying structural characteristics and form. Thermoplastic polyethylene molding powder is an example of a preferred inert, moldable organic plastic for the purposes of this invention, but a wide variety of other moldable organic plastics can be used depending upon the particular fuel cell reaction and electrolyte involved. For example, there can be used polyvinyl chloride, polytetrafluoroethylene, methyl methacrylate polymer, and cellulose acetate, as well as other moldable, lyophobic, organic plastic materials, so long as they are substantially inert to the fuel cell reactants and electrolyte to be employed in the fuel cell of which the electrode member is to form a part. The preferred porous, inert, electrically conductive particles are activated carbons that have a very large surface area, that is, 250 square meters per gram or more, and preferably 400 square meters per gram or more. A specific example of such a material is a high purity, activated carbon prepared from wood charcoal. However, other materials can be used. For example, there can be used other high surface-area, activated carbons as well as high surface area forms of other conductive inert materials such as silicon and germanium.

Figure 2:
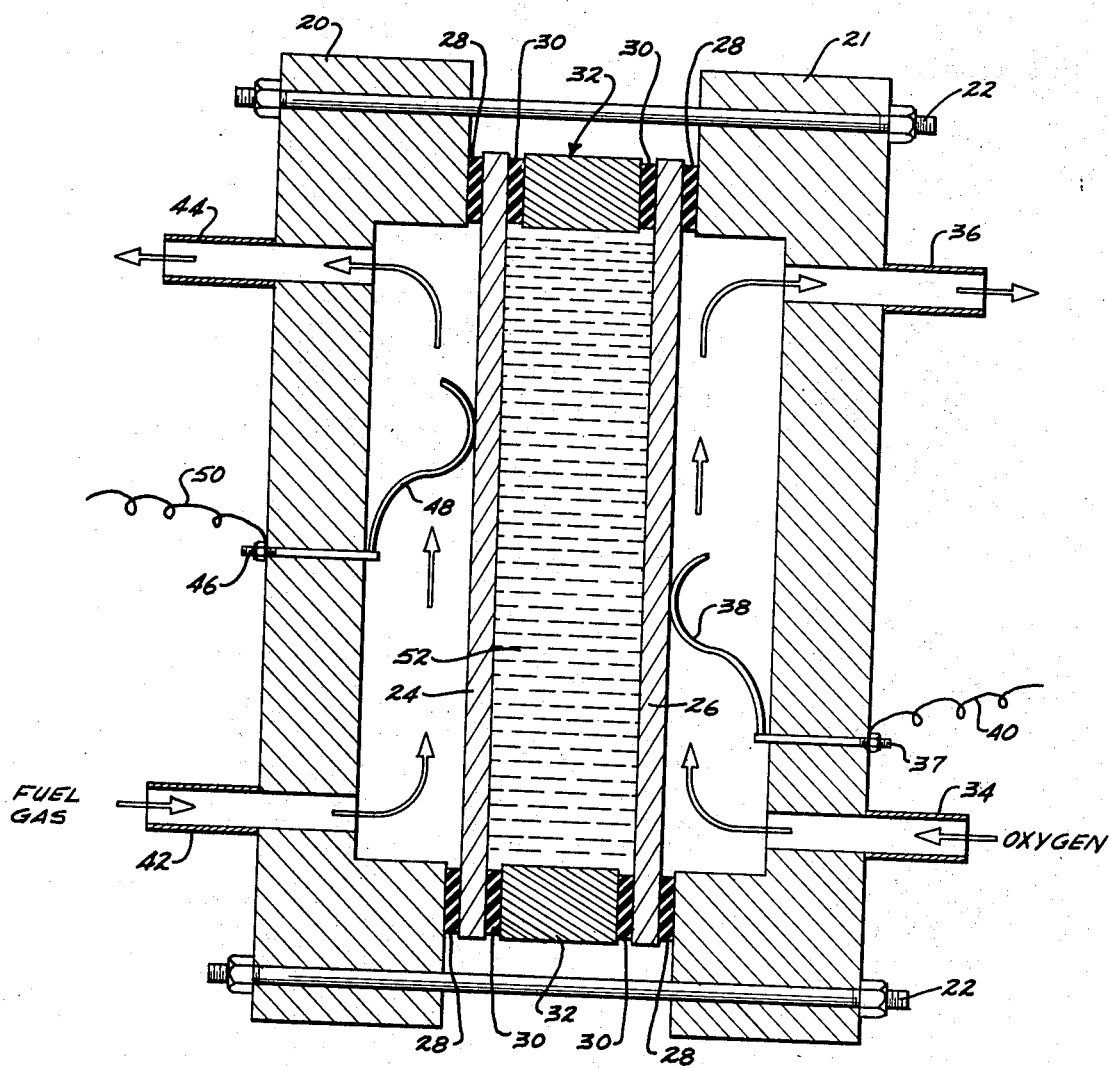

Referring briefly to the drawings, there is illustrated in FIG. 1 an enlarged view in vertical section of a fragment of a fuel cell anode member in accordance with the present invention. In FIG. 2, there is shown a fuel cell embodying an anode member prepared in accordance with the present invention.

In the manufacture of the herein-described electrodes, a wide variety of moldable organic plastic binders, synthetic and natural, can be used so long as the material chosen is resistant to attack by the electrolyte and the fuel to be employed in the fuel cell at the conditions at which the fuel cell is to be operated, and so long as such material has adequate cold or molten flow characteristics for the purposes of this invention at the temperature and pressure conditions under which the electrode member is to be formed. Good results have been obtained by the use of thermoplastic resinous materials in the form of molding powders, of which thermoplastic polyethylene molding powder—formed from polyethylene having an average molecular weight in the range of about 10,000 to 40,000—is an example. This material is especially advantageous not only because of its relatively good resistance to attack by both acidic and basic electrolytes, but also because relatively small amounts are required to form a coherent electrode structure of good mechanical strenth, whereby internal cell resistance is minimized. Examples of other thermoplastic resins are polyvinyl chloride, polytetrafluoroethylene, polymethyl methacrylate, and cellulose acetate. Polytetrafluoroethylene is advantageous where exceptional heat resistance is required. The invention is not limited to the use of these materials as still other materials can be used. For example, there can be used resinous latices such as butadiene-styrene synthetic rubber latices, thermo-setting resins such as phenol- and urea-formaldehyde resins, and natural resins such as rosin or colophony. The organic plastic employed as the binder in the present invention should not be utilized in a form so lacking in viscosity or particle size that penetration of a substantial proportion of the pores of the electrically conductive catalyst carrier particles will take place, so as to avoid effective reduction of surface area. Also, it will be understood that the particular organic plastic binder chosen in any individual instance should exhibit a molding or softening point above the temperature at which the fuel cell is to be operated.

As indicated above, the electrically conductive catalyst carrier particles are preferably high surface area, porous, activated carbons, that is, of the low-density type used in purifying liquids, although the invention includes the use of other inert, porous, high surface-area, conductive materials such as silicon. Appreciable open circuit voltages and current densities are obtainable when the surface area of the catalyst carrier particles is as little as 250 square meters per gram, but materials of much greater surface area, for example, 400 square meters per gram up to 1,800 square meters per gram or more are preferred, as the use of these materials is conducive to substantially greater current densities without undue electrode bulk. The greater surface areas are also advantageous for the reason that greater intercontact between gas and catalyst surface is made possible without the use of large amounts of valuable catalyst. The achievement of satisfactory current densities is important from the standpoint of practical application of fuel cells. An example of an electrically conductive, porous, catalyst carrier material with which good results are obtainable is Darco G–60 carbon, a high purity activated carbon that is manufactured from wood charcoal, activation being obtained by treating the raw material with heat and steam. The treated material is then washed with a strong mineral acid and then with water to yield a carbon containing less than 0.3 percent of water extractable material. The thus-treated material contains less than 0.05 percent chloride as NaCl and less than 0.05 percent iron as $Fe_2O_3$. This particular activated carbon has a surface area of about 570 square meters per gram and a bulk density of about 25 pounds per cubic foot. Also, there can be used Darco G–60 Special, a similar activated carbon having a surface area of 1,200 square meters per gram, a pore volume of 1.24 ml./g. and a mean pore radius of 20.8 angstron units.

The particular activator or catalytic agent distributed on the surfaces of the porous carbon or other inert catalyst carrier will, of course, vary in accordance with the particular anode fuel cell reaction desired, but is selected from the metals of Group VIII of the Periodic Table. These metals include iron, nickel, cobalt, palladium, platinum, ruthenium, rhodium, osmium and iridium. The oxides of the metals, especially the Iron Group metals, can also be employed. The particular preferred catalysts are the noble metals, especially platinum and palladium.

The fuel cell reaction activator or catalyst can be distributed upon the surfaces of the electrically conductive carrier particles in any convenient way. Deposition methods involving impregnation of the porous carrier particles, under pressure if desired, with a solution of the catalytic material, followed by conversion to a catalytic form, if necessary, is favored so as to extend the catalyst over the maximum possible surface area, interior and exterior, of the area particles. However, other deposition methods, such as electrolytic deposition, can be used. Alternatively, the catalyst can be incorporated into the carrier particle mass during the manufacture of the latter. The amount of catalyst that is deposited on the carrier particles will vary with the particular catalytic material chosen, but will generally be in the range of about 0.02 percent to 20 percent or more calculated as the metal by weight of the carrier, with preferred amounts between 0.1 and 10 percent by weight of the carrier.

In preparing the electrodes of this invention the binder plastic is employed in an amount no less than the minimum necessary to form a coherent structure of reasonable mechanical strength and to impart semi-lyophobic properties to such structure. On the other hand, the amount of binder plastic should not be so great as to electrically insulate a significant portion of the carrier particles from the carrier particles adjacent thereto. Within these limits, smaller proportions of binder are preferred as such proportions are conducive to relatively lower internal cell resistance. For maximum strength and lyophobic characteristics, the binder plastic should extend throughout all of the interstices between the compacted carrier particles, and for maximum electrical conductivity all of the conductive carrier particles should be in electrically conductive contact with adjacent like particles. In practice this situation may not always be fully achieved as some carrier particles may be electrically insulated from each other by thin films of binder plastic and/or the binder may not in fact fill every one of the interstices between adjacent carrier particles. For practical purposes, however, a reasonable approximation of the ideal structure suffices, so long as internal electrode resistance is maintained reasonably low, and so long as the mechanical strength and lyophobic properties of the electrode member are reasonably large. The actual amounts of binder resin necessary to perform the required functions in the electrodes of this invention can vary somewhat with the individual nature of the binder. For organic plastic binders of the kind disclosed herein, useful amounts may be in the range of about 2 percent to 80 percent by weight of the electrode. Amounts in the range of about 10 to 50 percent by weight of the electrode are preferred, as such amounts afford electrodes of good mechanical strength and electrical conductivity. The remainder of the electrode structure in each instance will consist essentially of the inert porous electrically conductive particles.

As indicated above the organic plastic binders can be utilized in a variety of moldable forms, thermoplastic resinous molding powders being illustrative of a preferred form. When using such molding powders it is preferred that the catalyst carrier particles and the molding powders be in finely divided form. Advantageously, both materials will be of about the same particle range. By way of illustration, the size of the resin and/or carrier particles may be as large as 0.84 mm. in diameter—that is, just small enough to pass a 20-mesh screen, U.S. Sieve Series—or they may be considerably smaller, for example, 0.44 mm. in diameter—that is, just small enough to pass a 325-mesh screen. Preferably, the particles will be in the range of 0.074 to 0.149 mm. in diameter—that is, small enough to pass a 200-mesh screen and be retained by 230-mesh screen, up to a size small enough to pass a 100-mesh screen and be retained by a 120-mesh screen.

The conditions employed in forming the gas permeable fuel cell anode members in accordance with this invention will vary with the particular organic plastic binder material selected. The pressure employed during such forming should be sufficient to provide electrically conductive contact between a substantial proportion of adjacent catalyst carrier particles, whereby a plurality of electrically conductive paths between the external surfaces of the electrode member are obtained. The molding temperature and pressure together should be such as to permit cold or molten flow of the binder through the interstices that remain between the compacted carrier particles. By way of illustration, temperatures in the vicinity of 170° C. and pressures in the range of 50 to 50,000 p.s.i., preferably 2,000 to 4,000 p.s.i., can be used with good results when using the thermoplastic polyethylene molding powders disclosed herein. The time required for molding will vary with the molding temperature and pressure and the form in which the binder resin is employed. By way of example, for thermoplastic polyethylene molding powder and for molding pressures and temperatures of the magnitude indicated therefor herein, good results can be obtained over periods ranging from about one minute to 24 hours, with about one-half to two hours being preferred. Although the limits indicated above have been referred to specifically in connection with polyethylene, the invention obviously is not limited thereto and good results are obtainable within the same ranges of conditions using other organic plastic binders disclosed herein.

In one embodiment of this invention, it has been found quite unexpectedly that an active anode structure can be formed by deposition of the catalytic agent from an aqueous solution of the Group VIII metal salt onto an anode previously formed by compressing together electrically conductive inert porous particles such as carbon with a lyophobic binder. Suitable Group VIII metal salts include the halides, for example platinum chloride, nickel chloride, palladium chloride, the acetates, etc. This result was surprising since it was believed the lyophobic binder might prevent the catalyst from depositing from an aqueous solution onto the porous particles of the electrically conductive material. The anode is then dried and heated to convert the metal salt to the active metal. This method and resulting composition are advantageous in that lesser amounts of catalyst are employed, and the catalyst is deposited near the surface of the anode where it is most needed.

The superior results of this invention are attributable in part to the depth in the electrode to which the plastic binder extends. In contrast, provision of mere superficial lyophobic protective coatings appears to require either a coating of such thickness that high internal resistances are obtained, or alternatively, to provide insufficient protection against wetting by electrolyte, that is to say, extremely thin superficial protective films are subject to breakdown, whereby access to the entire interior of the electrode by electrolyte is provided. In addition, the superficial coatings give no protection in the event of spalling. The provision of a superficial lyophobic coating may also be objectionable for the reason that a significant amount of catalyst is covered up that might otherwise be contacted by the electrolyte or the gaseous reactant.

The fuel cell anodes are most advantageous when used in low temperature fuel cells, that is, fuel cells operated at 100° C. or less, because these cells utilize aqueous electrolytes. However, the anodes of this invention are also useful in other types of fuel cells, as aqueous electrolytes under pressure can be used in medium temperature fuel cells, and as molten electrolytes that are capable of wetting fuel cell electrodes also can be used in either medium temperature or high temperature cells, that is, cells operating above 500° C. Accordingly, by selecting a binder and carrier that are not damaged at the operating temperature of the fuel cell in which the electrodes are to be employed, the herein-described electrodes can also be used in fuel cells operated at temperatures above those employed with low temperature cells.

Referring in greater detail to the drawings, in FIG. 1, numeral 1 designates an enlarged view of a fragment, in vertical section, of a fuel cell anode structure in accordance with this invention. In the same figure, numeral 2 refers to the discrete, porous, electrically conductive catalyst carrier particles that are in electrically conductive contact with adjacent particles. Numeral 3 denotes interstices between the compacted mass of carrier particles 2, which itnerstices in the illustration are filled with a continuous matrix of organic plastic binder material. Numeral 4 refers to a gauze or screen formed from a conductive material such as copper or platinum, which in a preferred embodiment is embedded in the electrode structure and which serves as a low resistance means for collecting and conducting electrical charges developed in the various parts of the electrode structure.

In FIG. 2, there is illustrated a fuel cell, in vertical section, employing disk-shape electrodes prepared in accordance with the present invention. In this figure numerals 20 and 21 refer, respectively, to opposite sides of the fuel cell housing or shell held in position by assembly bolts 22. Numeral 24 denotes the anode or fuel electrode of the cell. Electrodes 24 and 26 are spaced apart from the shell members 20 and 21 by means of gaskets 28 and are spaced apart from each other by means of gaskets 30 and spacer member 32. The electrodes 24 and 26 are electrically connected by a body of electrolyte 52 between the said electrodes and in contact therewith. Shell member 21 is provided with an oxidant inlet 34 and an oxidant outlet 36. Shell member 20 is provided with a fuel gas inlet 42 and a fuel gas outlet 44. The external circuit of the fuel cell is formed in part by resilient spring members 38 and 48 maintained in contact with the conductive gauze, not shown, embedded in the exterior surfaces of electrodes 26 and 24, metal terminals 37 and 46 positioned in and extending through shell members 21 and 20 and connected, respectively, to members 38 and 48, and lead wires 40 and 50.

In operation, using a basic aqueous electrolyte, air or oxygen, for example, at a pressure insufficient to pass through the permeable electrodes is circulated in inlet 34 past cathode 26 and through outlet 36. At the catalyst-oxygen-electrolyte contact face, oxygen and water take on electrons to form hydroxyl ions and hydroperoxide ions which migrate into the eletcrolyte toward the anode, leaving cathode 26 with an electron deficiency. At the anode, hydrogen, for example, is circulated past anode 24 similarly as the oxidant gas on the cathode side. The hydrogen gives up electrons to form hydrogen ions, which then react with the hydroxyl ions at the catalyst-hydrogen-electrolyte contact face to form water, leaving an electron surplus at the anode. In this way a potential between the anode and cathode is established in the external circuit.

In a specific instance, where aqueous potassium carbonate is the electrolyte, oxygen or air is the gaseous oxidant, hydrogen is the fuel gas, and platinum is the anodic and cathodic electrode activator, the electrolyte is considered to ionize as follows:

$$K_2CO_3 + H_2O \rightleftharpoons OH^- + 2K^+ + HCO_3^-$$

and the desired over-all reaction at the cathode in the alkaline fuel cell is

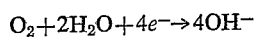

$$O_2 + 2H_2O + 4e^- \rightarrow 4OH^-$$

However, only in special situations can the reversible standard potential of the latter four-electron reaction be obtained. More usually the cathodic reaction is reversible with respect to the hydroperoxide ion, $HO_2^-$, as follows:

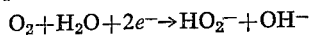
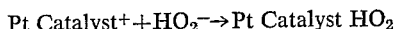
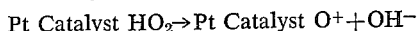
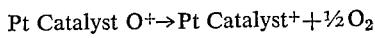

$$O_2 + H_2O + 2e^- \rightarrow HO_2^- + OH^-$$
$$HO_2^- \rightarrow OH^- + \tfrac{1}{2}O_2$$
$$\text{Pt Catalyst}^+ + HO_2^- \rightarrow \text{Pt Catalyst } HO_2$$
$$\text{Pt Catalyst } HO_2 \rightarrow \text{Pt Catalyst } O^+ + OH^-$$
$$\text{Pt Catalyst } O^+ \rightarrow \text{Pt Catalyst}^+ + \tfrac{1}{2}O_2$$

The anodic reaction is as follows:

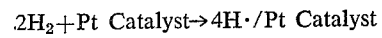
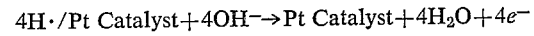

$$2H_2 + \text{Pt Catalyst} \rightarrow 4H \cdot / \text{Pt Catalyst}$$
$$4H \cdot / \text{Pt Catalyst} + 4OH^- \rightarrow \text{Pt Catalyst} + 4H_2O + 4e^-$$

In a similar instance except for the substitution of phosphoric acid as an acidic electrolyte, where phosphoric acid ionizes in the following manner:

$$H_3PO_4 + H_2O \rightarrow H_3O^+ + H_2PO_4^-$$

The cathodic reaction is as follows:

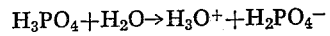

$$O_2 + 4H^+ + 4e^- \rightarrow 2H_2O$$

The anodic reaction is as follows:

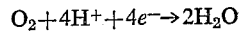
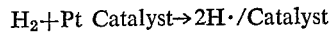
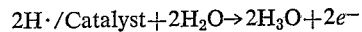

$$H_2 + \text{Pt Catalyst} \rightarrow 2H \cdot / \text{Catalyst}$$
$$2H \cdot / \text{Catalyst} + 2H_2O \rightarrow 2H_3O^+ + 2e^-$$
$$H_3O^+ \rightarrow H^+ + H_2O$$

The invention can be further understood by reference to the following specific embodiments.

EXAMPLE I

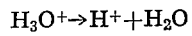

A high surface-area, activated carbon powder (Darco Grade G–60–S, surface area=1200 m.²/g.), in the amount of 50 grams, and 5.6 grams of platinum chloride were slurried in water. After removal of the water by evaporation the residue was reduced by hydrogen at 400° C. High molecular weight polyethylene powder prepared from polyethylene having an average molecular weight of 20,500 and an intrinsic viscosity of 0.850, of a size sufficiently small to pass a 60-mesh screen but too large to pass a 100-mesh screen, was added to the impregnated carbon in the proportion of 35 percent by weight of the mixture. The mixture was then blended in a powder blender for 10 minutes. A 25-mesh copper wire gauze was placed on the surface of 30 grams of the intimately admixed comminuted powders in a circular mold four inches in diameter. The powder was then formed into a disc 3/16 of an inch thick having the wire gauze embedded in one face thereof by compression in the mold at about 3,185 p.s.i. pressure and at 340° F. for one hour. Discs prepared in this manner had excellent mechanical strength, good conductivity and water repellency.

Two discs prepared in this manner were placed in a fuel cell of the kind illustrated in FIG. 2 with the wire gauze being positioned on the gas surface side of both electrodes. When the fuel cell was operated with a 30 percent potassium carbonate aqueous electrolyte solution and with hydrogen as the fuel gas and oxygen gas as the oxidant, the cell delivered 1.00 volt open circuit and 580 milliamperes (23 amperes per square foot) at 0.28 volt at 70° C.

In contrast, electrodes of the same size were prepared by slicing wafers from a Speer Company graphite grade 780 cylinder four inches in diameter. This material was found to have a surface area of less than two square meters per gram. The graphite wafers were treated with a saturated platinum chloride solution, dried, and reduced with hydrogen at 400° C. for 16 hours. The activated carbon discs were then treated with a heptane solution of high molecular weight poly-1-butene to impart water repellence thereto. When these discs were employed in the fuel cell described in this Example I, only 40 milliamps of current at 0.35 volt were obtained at 30° C. and only 100 milliamps of current at 0.06 volt at 70° C.

EXAMPLE II

Electrode discs were prepared as described in Example I from the polyethylene powder of Example I in the amount of 45 percent by weight and Darco Grade G-60-S carbon in the amount of 55 percent by weight, which carbon had previously been impregnated with a 10 percent aqueous platinum chloride solution, dried, and reduced at 200° C. with hydrogen. No copper wire gauze was employed in these discs. When the fuel cell of Example I was operated with these discs as the electrodes with ethylene as the fuel gas, a voltage of 0.27 volt at 3 milliamps and 0.03 volt at 47 milliamps were obtained at 70° C.

EXAMPLE III

Electrode discs were prepared as in Example II from 10.5 grams of the polyethylene powder of Example I, and 19.5 grams of another activated carbon powder (Darco Grade G-60, surface area 570 m.$^2$/g.), previously impregnated with platinum as described in Example I. When these electrodes were employed in the fuel cell reaction of Example II an open circuit voltage of 0.35 volt was obtained, and a voltage of 0.05 volt was obtained at 29 milliamps (1.1 amps/ft.$^2$).

EXAMPLE IV

Darco Grade G-60-S carbon powder in the amount of 75 grams and containing 10 percent platinum metal distributed on the surfaces thereof was treated with 640 grams of 25 percent aqueous phosphoric $H_3PO_4$ to insure that any basic components on the carbon would be removed. The aqueous phase was separated from the treated powder by filtration and the residue washed four times until the pH of the washings was found to be 2. The thus-obtained powder was vacuum-dried with heating to 100° C. for 16 hours at 10 mm. Hg pressure. The dried powder was mixed with polyethylene powder in the amount of 35 percent by weight of the mixture and electrode discs having no copper wire gauze embedded therein were molded as described in Example I. When these discs were employed in the fuel cell of Example I operated at 76° C., using a 76.5 percent phosphoric acid aqueous electrolyte, with 1-butene as the fuel gas and air as the oxidant gas, an open circuit voltage of 0.17 volt was obtained. When the same cell was operated with hydrogen as the fuel gas, an open circuit voltage of 0.80 volt was obtained. The hydrogen-air cell produced 45 milliamperes of current at 0.2 volt.

EXAMPLE V

Tetrafluoroethylene (Teflon) powder of a size such as to pass a 170-mesh screen and be retained by a 200-mesh screen was intimately admixed with an equal amount of Darco Grade G-60-S carbon powder. The mixture was molded to form electrode discs of the size previously described at the same conditions employed in Example I. The discs were then impregnated with catalysts by treatment with an aqueous solution containing 28 percent platinum chloride. The impregnated discs were dried at 150° C. and reduced by treating with hydrogen at 200° C. for 16 hours. The amount of platinum on the disc as determined by increase of weight was found to be four percent by weight of the disc. This amount corresponds to eight percent platinum on the carrier. When two discs prepared in this manner were employed in the fuel cell of the preceding example, using 1-butene as the fuel gas, a current of 33 milliamps (1.3 amps/ft.$^2$) at 0.02 volt at 80° C. was obtained.

EXAMPLE VI

A cathode electrode was prepared by admixing 27.5 parts of activated carbon powder (Darco Grade G-60-S), 14.5 parts of polyethylene powder (same as in Example I) and 58 parts of powdered silver oxide and pressing the mixture at 40,000 pounds per square inch at 340° F. for one hour. The above cathode was employed with an anode prepared as described in Example I in a fuel cell as described in Example I. The cell delivered 1.05 volts open circuit and 390 milliamperes at 0.30 volt at 73° C.

Comparison of the results obtained with the Example I electrodes with the results obtained with the graphite electrodes described in the same example shows the improved results obtainable by the electrodes and method of this invention. Comparison of the results obtained in Examples II and III further indicates the significance of variations in the surface area of the conductive carrier particles. Comparison of the results obtained in Examples IV and V indicates the advantages to be obtained by impregnating the preformed electrode member. In the use of this method it is important that a highly heat resistant organic plastic binder be employed in view of the reduction of platinum chloride at high temperature carried out after impregnation of the electrode member. A comparison of Examples I and VI shows a cathode prepared using admixed silver oxide functions well in a fuel cell.

It is emphasized that the foregoing specific examples are illustrative only and are not to be considered as limiting the scope of the invention. Thus, similarly good results can be obtained by substitution in the foregoing examples in the same or equivalent amounts of other organic plastic binders, other catalysts, and other electrically conductive carrier particles disclosed herein.

The herein-described invention is susceptible of numerous advantageous variations. Thus, if desired, heterogeneous electrode structures can be prepared that are partly permeable and partly impermeable to electrolyte by forming the electrode members with a relatively higher binder plastic content on the gas side and with a relatively lower binder plastic content on the electrolyte side. In this manner greater intercontact between electrolyte and catalyst can be obtained without flooding the electrode. If desired, the outer rim of the electrode member, that is, the portion not contacted directly by reactant gas or electrolyte, can be formed with a very high binder plastic content or, alternatively, entirely from binder plastic, whereby additional strength and resistance to gas leakage is obtained. Also, if desired, the method of this invention can be used to prepare an entire fuel cell in a single operation. For example, a fuel cell having a polyethylene housing, polyethylene-bonded, platinum-on-carbon electrodes, and an acidic or basic ion-exchange resin electrolyte can be formed in a single operation by appropriate arrangement of layers of the materials named, gas inlets and outlets being provided for during the single molding step.

The expression "catalytically promote" is employed in its relative sense to include either actual acceleration of the desired reaction, or retardation of undesired reactions, or both.

Numerous additional modifications and variations of the invention as herein set forth can be resorted to without departing from the spirit or scope thereof. Accordingly, only such limitations should be imposed as are indicated in the claims appended hereto.

I claim:
1. A method for manufacturing a gas permeable, semi-lyophobic, electrically conductive, coherent fuel cell anode electrode structure from an inert, moldable, lyophobic organic plastic binder selected from the group consisting of polyethylene and polytetrafluoroethylene and finely divided porous particles of an inert, electrically conductive material which comprises:
   depositing on the surfaces of said finely divided porous particles between 0.02 and 20 weight percent of a metal from Group VIII of the Periodic Table;
   admixing said binder and said electrically conductive material; and
   thereafter forming said anode electrode under a pressure sufficient to provide electrically conductive contact between adjacent particles of conductive material.

2. A method according to claim 1 wherein the amount of organic plastic binder is between 2 and 80 percent by weight of said structure.

3. A method according to claim 2 wherein the electrode forming pressure is in the range of about 50 to 50,000 p.s.i.

4. The method of claim 1 where said inert electrically conductive material is activated carbon having a surface area of at least 250 square meters per gram and where said activating agent is platinum.

5. The method of claim 1 wherein an electrically conductive metal screen is also embedded in said electrode structure.

6. The method of claim 1 wherein the organic plastic binder is polyethylene.

7. The method of claim 1 wherein the organic plastic binder is polyethylene.

8. A method for manufacturing a gas permeable, semi-lyophobic, electrically conductive, coherent fuel cell anode which comprises:
   admixing inert, finely divided porous particles of an electrically conductive material with an inert, moldable, lyophobic, organic plastic binder selected from the goup consisting of polyethylene and poly-tetrafluoroethylene;
   forming said anode under a pressure sufficient to provide electrically conductive contact between adjacent particles of conductive material; and
   thereafter contacting said formed anode with an aqueous solution of a Group VIII metal salt, drying said anode and thereafter reducing said metal salt to an active metal form.

9. The process of claim 8 wherein the Group VIII metal salt is platinum chloride, the electrically conductive material is carbon having a surface area of at least 250 square meters per gram, and the amount of organic plastic binder is between 10 and 50 percent by weight of said structure.

10. In a fuel cell comprising in combination therewith a semi-lyophobic anode, said anode comprising:
   an electrically conductive coherent structure comprising (1) an intimate admixture of an inert, moldable, lyophobic organic plastic binder selected from the group consisting of polyethylene and polytetrafluoroethylene and (2) finely divided particles of an inert electrically conductive material, at least a portion of said material having distributed on its surfaces between (3) 0.02 and 20 weight percent of a Group VIII metal, there being electrically conductive contact between adjacent particles of said electrically conductive material, and wherein said anode, the amount of plastic binder is between 2 and 80 weight percent of the anode.

11. The anode of claim 10 wherein substantially all of said material has distributed on its surfaces between 0.02 and 20 weight percent of a Group VIII metal and wherein the amount of organic plastic binder is between 2 and 80 percent by weight of said electrode.

12. The anode of claim 10 wherein substantially only the electrically conductive material on the outer surface of the anode has distributed on its surfaces a metal from Group VIII of the Periodic Table.

13. The anode of claim 11 wherein the electrically conductive material is carbon having a surface area of at least 250 square meters per gram.

14. The anode of claim 13 wherein the metal is platinum.

15. The anode of claim 12 wherein the Group VIII metal is deposited on the carbon from an aqueous solution of a Group VIII metal salt.

16. The anode of claim 15 wherein the metal is platinum and the plastic binder is polytetrafluoroethylene.

17. The anode of claim 11 where an electrically conductive metal screen is also embedded in said structure.

18. The anode of claim 14 wherein the plastic binder is polyethylene.

References Cited

UNITED STATES PATENTS

| | | | |
|---|---|---|---|
| 2,396,629 | 3/1946 | Alfthan et al. | 264—127 |
| 2,400,099 | 5/1946 | Brubaker et al. | 264—127 |
| 2,566,105 | 8/1951 | Zert | 136—122 |
| 2,615,932 | 10/1952 | Marko et al. | 136—136 |
| 2,641,623 | 6/1953 | Winckler et al. | 136—121 |
| 2,782,180 | 2/1957 | Weidman | 136—122 |
| 2,838,590 | 6/1958 | Garine | 136—30 |
| 3,113,048 | 12/1963 | Thompson | 136—86 |
| 3,297,484 | 1/1967 | Niedrach | 136—86 |

FOREIGN PATENTS 1,261,704  4/1961  France.

WINSTON A. DOUGLAS, Primary Examiner

A. SKAPARS, Assistant Examiner

U.S. Cl. X.R.

136—86, 121; 264—61, 127

PO-1050
(5/69)

UNITED STATES PATENT OFFICE
CERTIFICATE OF CORRECTION

Patent No. 3,531,329      Dated September 29, 1970

Inventor(s) Charles M. Selwitz

It is certified that error appears in the above-identified patent and that said Letters Patent are hereby corrected as shown below:

Column 7, lines 65 and 66, "Numeral 24 denotes the anode or fuel electrode of the cell" should read -- Numeral 24 denotes the anode or fuel electrode and numeral 26 denotes the cathode or oxidant electrode of the cell -- .

Column 8, line 59, "$2H \cdot /Catalyst + 2H_2O \rightarrow 2H_3O + 2e^-$" should read -- $2H \cdot /Catalyst + 2H_2O \rightarrow 2H_3O^+ + 2e^-$ -- .

SIGNED AND SEALED

FEB 23 1971

(SEAL)
Attest:

Edward M. Fletcher, Jr.
Attesting Officer

WILLIAM E. SCHUYLER, JR.
Commissioner of Patents